(12) United States Patent
Awoniyi et al.

(10) Patent No.: US 9,781,659 B2
(45) Date of Patent: Oct. 3, 2017

(54) PROXIMITY DETECTION FOR FEMTOCELLS USING OUT-OF-BAND LINKS

(75) Inventors: Olufunmilola O. Awoniyi, San Diego, CA (US); Samir S. Soliman, San Diego, CA (US); Soumya Das, San Diego, CA (US); Andrei D. Radulescu, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 307 days.

(21) Appl. No.: 13/222,972

(22) Filed: Aug. 31, 2011

(65) Prior Publication Data

US 2012/0094663 A1 Apr. 19, 2012

Related U.S. Application Data

(60) Provisional application No. 61/393,533, filed on Oct. 15, 2010.

(51) Int. Cl.
*H04W 36/00* (2009.01)
*H04W 48/16* (2009.01)
(Continued)

(52) U.S. Cl.
CPC ........ *H04W 48/16* (2013.01); *H04W 36/0055* (2013.01); *H04W 36/04* (2013.01); *H04W 84/045* (2013.01)

(58) Field of Classification Search
CPC .......... H04W 4/00–4/008; H04W 4/02–4/046; H04W 8/005–8/30; H04W 36/00–36/385
(Continued)

(56) References Cited

U.S. PATENT DOCUMENTS 6,574,266 B1 * 6/2003 Haartsen ........................ 375/133
6,768,726 B2    7/2004 Dorenbosch et al.
(Continued)

FOREIGN PATENT DOCUMENTS

CN    101150864 A    3/2008
CN    101359969 A    2/2009
(Continued)

OTHER PUBLICATIONS

Tiedemann E.G.: "Femtocell Activities in 3GPP2 TSG-C" 3GPP2 Mar. 31, 2009 (Mar. 31, 2009), XP002599307 Retrieved from the Internet: URL:ftp://ftp.3gpp2.org/TSGX/Working/2009/2009-03-New%20Orleans/All%2OTSG%20Femto%20Discussion/ XS1 -20090331 -004_TSG-C_Femto%20Overview-090330.ppt [retrieved on Sep. 2, 2010].
(Continued)

*Primary Examiner* — Steve D Agosta
(74) *Attorney, Agent, or Firm* — QUALCOMM Incorporated

(57) ABSTRACT

Systems, methods, devices, and computer program products are described for supporting macrocell-to-femtocell hand-ins of active macrocell communications for a mobile device. A mobile device may perform an out-of-band (OOB) search for the femtocell, the OOB search triggered by a proximity detection configuration command from the macrocell. The mobile device may wirelessly communicate with a located femtocell via an OOB link, and receive femtocell information from the femtocell via the OOB link. The mobile device may transmit the received femtocell information to the macrocell. The macrocell may generate instruction for a mobile device search based on the femtocell information. The macrocell may transmit such instructions to the mobile device for an in-band search for the femtocell.

21 Claims, 11 Drawing Sheets

(51) Int. Cl.
*H04W 36/04* (2009.01)
*H04W 84/04* (2009.01)

(58) Field of Classification Search
USPC .......... 455/436–444, 452.1–453, 41.2, 41.3, 455/550.1, 552.1, 553.1; 370/310.2, 328, 370/331–334, 338
See application file for complete search history.

(56) References Cited

U.S. PATENT DOCUMENTS

| | | |
|---|---|---|
| 7,925,259 B2 | 4/2011 | Nylander et al. |
| 8,086,236 B2 | 12/2011 | Wu |
| 8,102,825 B2 | 1/2012 | Kalhan |
| 8,180,368 B2 * | 5/2012 | Anderson et al. ......... 455/456.1 |
| 8,185,116 B2 | 5/2012 | Wu |
| 8,204,481 B2 | 6/2012 | Kone |
| 8,270,431 B2 | 9/2012 | Brisebois et al. |
| 8,630,640 B2 | 1/2014 | Das et al. |
| 8,838,117 B2 | 9/2014 | Soliman et al. |
| 2005/0111409 A1 | 5/2005 | Spear et al. |
| 2005/0186948 A1 | 8/2005 | Gallagher et al. |
| 2006/0148485 A1 * | 7/2006 | Kangas et al. ................ 455/453 |
| 2006/0258323 A1 | 11/2006 | Hara et al. |
| 2007/0037578 A1 | 2/2007 | Besterman |
| 2008/0076386 A1 | 3/2008 | Khetawat et al. |
| 2008/0076411 A1 | 3/2008 | Khetawat et al. |
| 2008/0305801 A1 | 12/2008 | Burgess et al. |
| 2009/0040972 A1 | 2/2009 | Robson et al. |
| 2009/0044239 A1 | 2/2009 | Cha |
| 2009/0082020 A1 | 3/2009 | Ch'ng et al. |
| 2009/0092097 A1 | 4/2009 | Nylander et al. |
| 2009/0098873 A1 | 4/2009 | Gogic |
| 2009/0124235 A1 | 5/2009 | Bosch et al. |
| 2009/0129341 A1 | 5/2009 | Balasubramanian et al. |
| 2009/0156213 A1 | 6/2009 | Spinelli et al. |
| 2009/0163216 A1 | 6/2009 | Hoang et al. |
| 2009/0186615 A1 | 7/2009 | Kwon et al. |
| 2009/0196253 A1 | 8/2009 | Semper |
| 2009/0207805 A1 | 8/2009 | Zou |
| 2009/0219888 A1 | 9/2009 | Chen et al. |
| 2009/0247170 A1 | 10/2009 | Balasubramanian et al. |
| 2009/0286510 A1 | 11/2009 | Huber et al. |
| 2009/0310568 A1 | 12/2009 | Chen et al. |
| 2009/0325583 A1 | 12/2009 | Burgess et al. |
| 2010/0029278 A1 | 2/2010 | Fang et al. |
| 2010/0056132 A1 | 3/2010 | Gallagher |
| 2010/0056160 A1 | 3/2010 | Kim et al. |
| 2010/0120398 A1 | 5/2010 | Chang et al. |
| 2010/0124927 A1 | 5/2010 | Eskicioglu et al. |
| 2010/0144371 A1 | 6/2010 | Savoor |
| 2010/0240365 A1 | 9/2010 | Chen |
| 2010/0273432 A1 | 10/2010 | Meshkati et al. |
| 2010/0273471 A1 | 10/2010 | Meshkati et al. |
| 2010/0273473 A1 | 10/2010 | Meshkati et al. |
| 2010/0273481 A1 | 10/2010 | Meshkati et al. |
| 2010/0304741 A1 | 12/2010 | Gogic et al. |
| 2010/0315974 A1 * | 12/2010 | Richardson et al. ......... 370/254 |
| 2010/0330903 A1 | 12/2010 | Chabrerie |
| 2011/0085564 A1 | 4/2011 | Taylor et al. |
| 2011/0170481 A1 | 7/2011 | Gomes et al. |
| 2011/0171915 A1 | 7/2011 | Gomes et al. |
| 2011/0189998 A1 | 8/2011 | Joo et al. |
| 2011/0237269 A1 | 9/2011 | Chen |
| 2011/0263242 A1 | 10/2011 | Tinnakornsrisuphap et al. |
| 2011/0263258 A1 | 10/2011 | Soliman et al. |
| 2012/0014267 A1 | 1/2012 | Gomes et al. |
| 2012/0064903 A1 | 3/2012 | Pani et al. |
| 2012/0083245 A1 | 4/2012 | Adjakple et al. |
| 2012/0083280 A1 | 4/2012 | Liu et al. |
| 2012/0094665 A1 | 4/2012 | Soliman et al. |
| 2012/0094666 A1 | 4/2012 | Awoniyi et al. |
| 2012/0106349 A1 | 5/2012 | Adjakple et al. |
| 2012/0108234 A1 | 5/2012 | Bao et al. |
| 2012/0115474 A1 | 5/2012 | Lee et al. |
| 2012/0149362 A1 | 6/2012 | Tooher et al. |
| 2012/0252435 A1 | 10/2012 | Bienas et al. |
| 2012/0263145 A1 | 10/2012 | Marinier et al. |
| 2012/0269095 A1 | 10/2012 | Dalsgaard et al. |
| 2012/0322466 A1 | 12/2012 | Das et al. |
| 2013/0003698 A1 | 1/2013 | Olvera-Hernandez et al. |
| 2013/0017820 A1 | 1/2013 | Drazynski et al. |

FOREIGN PATENT DOCUMENTS

| | | |
|---|---|---|
| GB | 2444756 A | 6/2008 |
| JP | 2001320755 A | 11/2001 |
| JP | 2006319878 A | 11/2006 |
| JP | 2009302977 A | 12/2009 |
| JP | 2010147682 A | 7/2010 |
| JP | 2011528540 A | 11/2011 |
| KR | 20100026921 A | 3/2010 |
| WO | 2008055251 A2 | 5/2008 |
| WO | 2008073554 | 6/2008 |
| WO | 2008088592 | 7/2008 |
| WO | WO2009120902 A1 | 10/2009 |
| WO | 2009139675 A1 | 11/2009 |
| WO | WO2010009162 A1 | 1/2010 |
| WO | WO2011020481 A1 | 2/2011 |
| WO | WO2011028954 A1 | 3/2011 |
| WO | WO-2011093531 A1 | 8/2011 |

OTHER PUBLICATIONS

Anonymous: "Interoperability Specification (IOS) for Femtocell Access Points", 3GGP2 3GGP2 A.S0024-0 vl.O, Mar. 1, 2010 (Mar. 1, 2010), p. 64PP, XP002659293, Retrieved from the Internet: URL:http://www.3gpp2.org/publi cjitml/specs /A.S0024-0_v1.0_100302.pdf [retrieved on Sep. 16, 2011].

Anonymous: "Interoperability Specification (IOS) for Femtocell Access Points", 3GPP2 3GGP2 A.S0024-A vl.O, Apr. 1, 2011 (Apr. 1, 2011), p. 128PP, XP002650581, Retrieved from the Internet: URL:http://www.3gpp2.org/public html/specs /A.S0024-A%20vl.0 %20Femto%20IOS-Pub 201104 .pdf [retrieved on Jul. 15, 2011].

Airvana, QUALCOMM: "Active Call Hand-in in cdma2000 1x", A20-20081027-008r0, 3GPP2, Oct. 27, 2008, pp. 7.

Telefonica: "Dynamic H(e)NB Switching by Means of a Low Power Radio Interface for Energy Savings and Interference Reduction", R3-110030,3GPP,Jan. 21, 2011,pp. 1-5.

* cited by examiner

PROXIMITY DETECTION FOR FEMTOCELLS USING OUT-OF-BAND LINKS

CROSS-REFERENCE TO RELATED APPLICATIONS

The present Application claims priority to Provisional Application No. 61/393,533 entitled "Uniquely Identifying Target Femtocell to Facilitate Femto-Assisted Active Hand-in" filed Oct. 15, 2010, and assigned to the assignee hereof and hereby expressly incorporated by reference herein. This application is also related to: U.S. patent application Ser. No. 13/223,103, filed Aug. 31, 2011, entitled "UNIQUELY IDENTIFYING TARGET FEMTOCELL TO FACILITATE FEMTO-ASSISTED ACTIVE HAND," and U.S. patent application Ser. No. 13/223,048, filed Aug. 31, 2011, entitled "FEMTOCELL INDICATION OF MOBILE DEVICE PROXIMITY AND TRANSMISSION OF MOBILE IDENTITY TO ASSIST IN RESOLVING FEMTOCELL DISAMBIGUATION," each assigned to the assignee hereof and hereby expressly incorporated by reference herein.

BACKGROUND

Communication networks are in wide use today, and often have multiple devices in communication over wireless links to carry voice and data. Many of these devices, such as cellular phones, smartphones, laptops, and tablets, are mobile, and may connect with a network wirelessly via a base station, access point, wireless router, or Node B (collectively referred to herein as "access points"). A mobile device may remain within the service area of such an access point for a relatively long period of time (thereby being "camped on" the access point) or may travel relatively rapidly through access point service areas, with cellular handover or reselection techniques being used for maintaining a communication session, or for idle mode operation as association with access points is changed.

Issues with respect to available spectrum, bandwidth, or capacity may result in an access being unavailable or inadequate between certain mobile devices and an access point. Likewise, issues with respect to wireless signal propagation (e.g., shadowing, multipath fading, interference, etc.) may result in access being unavailable for particular mobile devices.

Cellular networks have employed the use of various cell types, such as macrocells, microcells, picocells, and femtocells, to provide desired bandwidth, capacity, and wireless communication coverage within service areas. Femtocells may be used to provide wireless communication in areas of poor network coverage (e.g., inside of buildings), to provide increased network capacity, and to utilize broadband network capacity for backhaul. For network scenarios where femtocells are deployed in the vicinity of macrocells, mobile devices may be directed by the network to search for femtocells and report to the network when the mobiles are in the vicinity of such cells. If the mobiles search for the cells and at the same time they are attending to data transmission and reception, the system performance during such activities may be significantly impacted.

SUMMARY

The present disclosure is directed to systems and methods for supporting macrocell-to-femtocell hand-ins of active macro communications for mobile devices. A mobile device may perform an out-of-band (OOB) search for the femtocell. This OOB search may be triggered by a proximity detection configuration message from the macrocell, or there may be other triggering mechanisms. The mobile device may wirelessly communicate with a located femtocell via an OOB link, and receive femtocell information (e.g., a primary scrambling code (PSC), a cell ID, a closed subscriber group (CSG) ID, or CSG membership) from the femtocell via OOB signals. The mobile device may transmit the received femtocell information to the macrocell. The macrocell may generate instructions for a mobile device search based on the femtocell information. The macrocell may transmit such instructions to the mobile device for an in-band search for the femtocell.

A method for femtocell discovery by a mobile device being served by a macrocell may include performing an out-of-band (OOB) search for the femtocell, receiving femtocell information from a femtocell access point via an OOB link with the femtocell, transmitting the received femtocell information to the macrocell, and receiving instructions from the macrocell to search for the femtocell. The method may include transmitting the received femtocell information to the macrocell, and may include transmitting only a portion of the total amount of femtocell information received from a macrocell.

The instructions from the macrocell to search for the femtocell may include instructions from the macrocell to acquire system information from the femtocell. The method may include transmitting power measurements and a remainder of the total amount of femtocell information to the macrocell.

The method may include receiving data instructing the mobile device to search for a femtocell in its vicinity, and initiating the OOB search in response to the received data, wherein the femtocell information is received through an OOB link established based on the OOB search. The data instructing the mobile device to search for femtocells in its vicinity may be a proximity detection configuration command from the macrocell.

The OOB search may be triggered by global positional system information or information from neighboring macrocells. The OOB search may include entering a Bluetooth page scan state, a Bluetooth page, inquiry, or inquiry scan state. The OOB search may include entering a first OOB search state for a time period, and entering a second, power-saving OOB search state upon expiration of the time period, the second, power-saving OOB search associated with a lower power consumption rate than the first OOB search state.

Receiving the femtocell information from the femtocell may include receiving a primary scrambling code (PSC), frequency, radio access technology (RAT), a cell ID, a closed subscriber group (CSG) ID, and CSG membership information from the femtocell. The method may include: storing a primary scrambling code (PSC), frequency, radio access technology (RAT), a cell ID, a closed subscriber group (CSG) ID, and CSG membership information from each of a plurality of femtocells; retrieving the stored PSC, frequency, RAT, cell ID, CSG ID, or CSG membership information for the femtocell in response to receiving the femtocell information; and transmitting the retrieved PSC, frequency, RAT, cell ID, CSG ID, or CSG membership information with the femtocell information to the macrocell.

The frequency band specified for use by the femtocell may include a frequency band in use by the macrocell. The frequency band specified for use by the femtocell may be different than a frequency band in use by the macrocell.

Performing the OOB search for the femtocell may include performing the OOB search for the femtocell while the mobile device is in connected mode with macrocell. Instructions from the macrocell to search for the femtocell may include instructions to the mobile device to search and acquire information on the femtocell in compressed mode.

A system for femtocell discovery by a mobile device being served by a macrocell may include means for performing an out-of-band (OOB) search for a femtocell; means for receiving femtocell information from the femtocell via an OOB link with the femtocell; means for transmitting the received femtocell information to the macrocell; and means for receiving instructions from the macrocell to search for the femtocell.

The means for transmitting may include means for transmitting only a portion of total amount of femtocell information received from a macrocell, and the instructions from the macrocell to search for the femtocell further may include instructions from the macrocell to acquire system information from the femtocell.

The system may include means for receiving data instructing the mobile device to search for femtocells in its vicinity, and means for initiating the OOB search in response to the received data, wherein the femtocell information is received through an OOB link established as a result of the OOB search.

A mobile device may include an out-of-band (OOB) transceiver module configured to perform an out-of-band (OOB) search for a femtocell, and receive femtocell information from a femtocell access point via an OOB link with the femtocell. The mobile device may include an in-band transceiver module configured to transmit the received femtocell information to a macrocell serving the mobile device. The mobile device may receive instructions from the macrocell to search for the femtocell.

The in-band transceiver module may further be configured to receive data instructing the mobile device to search for a femtocell in its vicinity, and the OOB transceiver may further be configured to initiate the OOB search in response to the received data. The data instructing the mobile device to search for a femtocell in its vicinity may include a proximity detection configuration command from the macrocell.

The OOB search may be triggered by global positional system information or information from neighboring macrocells. To perform the OOB search, the OOB transceiver may be configured to operate in a Bluetooth page scan state, in a Bluetooth page, inquiry, or inquiry scan state. The OOB transceiver may be configured to operate in a first OOB search state for a time period, and operate in a second, power-saving OOB search state upon expiration of the time period, the second, power-saving OOB search associated with a lower power consumption rate than the first OOB search state.

The femtocell information may include a primary scrambling code (PSC), frequency, radio access technology (RAT), a cell ID, a closed subscriber group (CSG) ID, and CSG membership. Memory may be configured to store a primary scrambling code (PSC), frequency, radio access technology (RAT), a cell ID, a closed subscriber group (CSG) ID, and CSG membership information from each of a plurality of femtocells. A processor module, communicatively coupled with the memory, the in-band transceiver, and the OOB transceiver, may be configured to retrieve the stored PSC, frequency, RAT, cell ID, CSG ID, or CSG membership information for the femtocell based on the femtocell information, and forward the retrieved PSC, frequency, RAT, cell ID, CSG ID, or CSG membership information to the in-band transceiver for transmission to the macrocell. A frequency band specified for use by the femtocell may include a frequency band in use by the macrocell, and may be different than a frequency band in use by the macrocell.

The OOB transceiver module may perform the OOB search for the femtocell while the in-band transceiver operates in connected mode with the macrocell. Instructions from the macrocell to search for the femtocell may include instructions OOB transceiver to search for and acquire information on the femtocell in compressed mode.

A computer program product for facilitating femtocell discovery may include a computer-readable medium which in turn may include: code for performing an out-of-band (OOB) search for a femtocell; code for receiving femtocell information from the femtocell via an OOB link with the femtocell; code for transmitting the received femtocell information to the macrocell; and code for receiving instructions from the macrocell to search for the femtocell. The computer-readable medium may include code for receiving data instructing the mobile device to search for a femtocell in its vicinity, and code for initiating the OOB search in response to the received data, wherein the femtocell information is received through an OOB link established as a result of the OOB search.

A method for femtocell discovery may include receiving femtocell information from a mobile device. The femtocell may be identified by the device via an out-of-band (OOB) link, may generate instructions for the mobile device to search for the femtocell based on the femtocell information; and may transmit the instructions to the mobile device. The method may include transmitting data instructing the mobile device to search for a femtocell in its vicinity to trigger an OOB search by the mobile device.

The data indicating the femtocell may be in vicinity of the mobile device comprises a proximity detection configuration command. The transmitting data may be triggered by global positional system information or information from neighboring macrocells. The femtocell information may include a primary scrambling code (PSC), frequency, radio access technology (RAT), a cell ID, a closed subscriber group (CSG) ID, CSG membership information, or frequency information. The instructions to search for the femtocell may include instructions to the mobile device to search for and acquire information on the femtocell in compressed mode.

The method may include transmitting the femtocell information to other mobile devices to trigger the mobile device to perform OOB searches for the femtocell. The method may include determining that a traffic load on a macrocell exceeds a threshold, wherein transmitting the femtocell information to other mobile devices may be triggered by the determining.

The foregoing has outlined rather broadly the features and technical aspects of examples according to disclosure. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only and not as a definition of the limits of the claims.

BRIEF DESCRIPTION OF THE DRAWINGS

A further understanding of the nature and advantages of examples provided by the disclosure may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, the reference numeral refers to all such similar components.

FIG. 5 shows a call flow diagram illustrating aspects of a femtocell hand-in;

DETAILED DESCRIPTION OF THE INVENTION

The following description generally relates to facilitating hand-in from a macrocell to a femtocell. A mobile device may perform an out-of-band (OOB) search for a femtocell, and wirelessly communicate with a located femtocell via an OOB link. The mobile device may receive femtocell information over the OOB link with the femtocell, and transmit the received femtocell information to the macrocell. The macrocell may generate instructions for a mobile device search based on the femtocell information. The macrocell may transmit such instructions to the mobile device to perform an in-band search for the femtocell.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
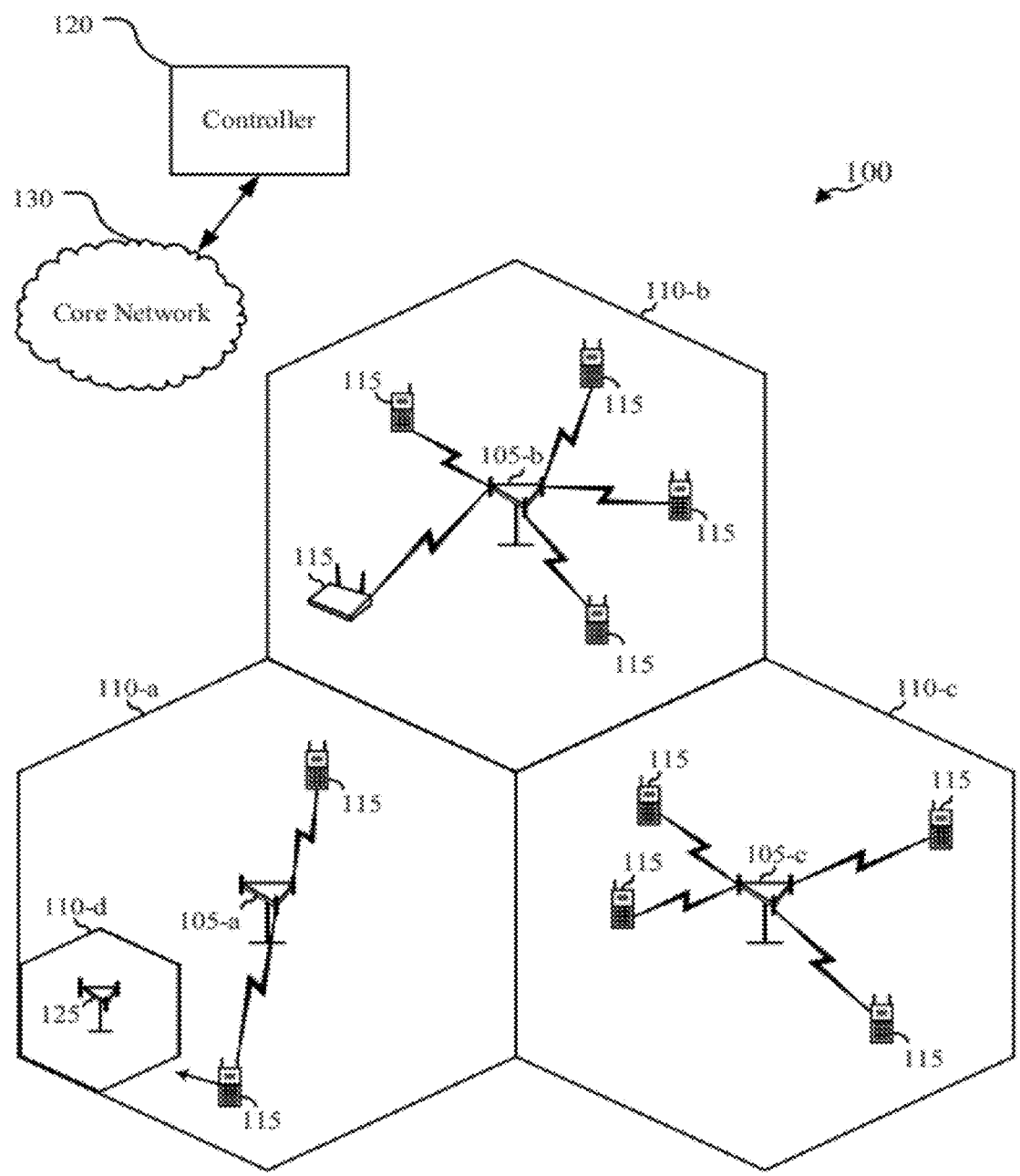
FIG. 1 illustrates a block diagram of a wireless communications system.

Referring first to FIG. 1, a block diagram illustrates an example of a wireless communications system 100. The system 100 includes macrocell base stations 105, mobile devices 115, a base station controller 120, and a core network 130 (the controller 120 may be integrated into the core network 130). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, Time Division Multiple Access (TDMA) signal, Frequency Division Multiple Access (FDMA) signal, Orthogonal FDMA (OFDMA) signal, Single-Carrier FDMA (SC-FDMA) signal, etc. Each modulated signal may be sent on a different carrier and may carry control information (e.g., pilot signals), overhead information, data, etc. The system 100 may be a multi-carrier LTE network capable of efficiently allocating network resources.

The macrocell base stations 105 may wirelessly communicate with the mobile devices 115 via a base station antenna. The macrocell base stations 105 are configured to communicate with the mobile devices 115 under the control of the controller 120 via multiple carriers. Each of the base station 105 sites can provide communication coverage for a respective geographic area. The coverage area for each macrocell base station 105 here is identified as 110-a, 110-b, or 110-c. The coverage area for a base station may be divided into sectors (not shown, but making up only a portion of the coverage area). The system 100 may include base stations 105 of different types (e.g., macro, micro, and/or pico base stations). As used herein, the term "cell" may refer to 1) a sector, or 2) a site (e.g., a base station 105). Thus, the term "macrocell" may refer to 1) a macrocell sector, 2) a macrocell base station (e.g., macrocell base station 105), and/or 3) a macrocell controller. Thus, the term "femtocell" may refer to 1) a femtocell sector, or 2) a femtocell base station (e.g., femtocell access point 125).

The mobile devices 115 may be dispersed throughout the coverage areas 110. The mobile devices 115 may be referred to as mobile stations, mobile devices, access terminals (ATs), user equipments (UEs), or subscriber units. The mobile devices 115 may include cellular phones and wireless communications devices, but may also include personal digital assistants (PDAs), smartphones, other handheld devices, netbooks, notebook computers, etc.

For the discussion, it may be assumed that the mobile devices 115 are initially operating on (e.g., are "camped on") a macrocell base station 105. Each macrocell base station 105 may cover a relatively large geographic area (e.g., hundreds of meters to many kilometers in radius) and may allow unrestricted access by mobile devices with service subscription. A portion of the mobile devices 115 may also be registered to operate (or otherwise allowed to operate) in femtocell coverage area 110-d (e.g., communicating with femtocell access point (FAP) 125), within the coverage area of a macrocell 110-a. As a mobile device 115 approaches a femtocell, there may be need for novel mechanisms for the mobile device 115 to recognize the presence of the FAP 125 so that the mobile device 115 may migrate to the FAP 125 from the macrocell base station 105.

Strategic deployment femtocells may be used to mitigate mobile device power consumption, as mobile devices 115 typically operate using an internal power supply, such as a small battery, to facilitate highly mobile operation. Femtocells may be used to offload traffic and reduce spectrum usage at a macrocell. Femtocells may also be utilized to provide service within areas which might not otherwise experience adequate or even any service (e.g., due to capacity limitations, bandwidth limitations, signal fading, signal shadowing, etc.), thereby allowing mobile devices 115 to reduce searching times, to reduce transmit power, to reduce transmit times, etc. A FAP 125 may provide service within a relatively small service area (e.g., within a house or building). Accordingly, a mobile device 115 is typically disposed near a femtocell 110-*d* when being served, often allowing the mobile device 115 to communicate with reduced transmission power.

By way of example, the femtocell may be implemented as a Home Node B ("HNB") or Home eNode B (HeNB), and located in a user premises, such as a residence, an office building, etc. FAP 125 will be used hereinafter generically to describe any femtocell access point, and should not be interpreted as limiting. The FAP 125 location may be chosen for maximum coverage (e.g., in a centralized location), to allow access to a global positioning satellite (GPS) signal (e.g., near a window), or in other locations. A set of mobile devices 115 may be registered on (e.g., on a whitelist of) a single FAP 125 that provides coverage over substantially an entire user premises. The "home" FAP 125 provides the mobile devices 115 with access to communication services via a connection to the macrocell communications network. As used herein, the macrocell communications network is assumed to be a wireless wide-area network (WWAN). As such, terms like "macrocell network" and "WWAN network" are interchangeable. Similar techniques may be applied to other types of network environments, FAP coverage topologies, etc., without departing from the scope of the disclosure or claims.

Systems, methods, devices, and computer program products are described for facilitating femtocell discovery in a wireless communications system. In example configurations, the FAP 125 may be integrated with one or more OOB transceivers. The FAP 125 may transmit or receive OOB discovery signals (e.g., Bluetooth page or inquiry signals) to or from a mobile device 115 to facilitate the exchange of femtocell and device information. The FAP 125 may, of course, also be configured to connect with a mobile device 115 via in-band signals. A mobile device 115 may perform an out-of-band search for the FAP 125, the OOB search triggered by a proximity detection configuration message from the macrocell base station 105-*a*. The mobile device 115 may wirelessly communicate with a located FAP 125 via an OOB link, and receive femtocell information via OOB signals. The mobile device 115 may transmit the received femtocell information to the macrocell base station 105-*a*. The macrocell base station 105-*a* may generate instructions for a mobile device search based on the femtocell information. The macrocell base station 105-*a* may transmit such instructions to the mobile device to conduct an in-band search for the femtocell.

As used herein, the term "frequency range" may be used to refer to the frequency spectrum allocated to a particular macrocell or femtocell, or for OOB signaling. A macrocell frequency range may be a first frequency channel within a set of frequencies allocated to WWAN communications, and a femtocell frequency range may be a second frequency channel within the set of frequencies allocated to WWAN communications. The macrocell frequency range and the femtocell frequency range may the same, or different (therefore, there may be an intra-frequency or inter-frequency search for a femtocell). Additional macrocell frequency ranges may occupy other frequency channels within the set of frequencies allocated to WWAN communications.

As used herein, "out-of-band," or "OOB," includes any type of communications that are out of band with respect to the macrocell or femtocell communications network. For example, a FAP 125 and/or the mobile device 115 may be configured to operate using Bluetooth (e.g., class 1, class 1.5, and/or class 2), ZigBee (e.g., according to the IEEE 802.15.4-2003 wireless standard), near field communication (NFC), WiFi, an ultra-wideband (UWB) link, and/or any other useful type of communications out of the macrocell network band.

OOB integration with the FAP 125 may provide a number of features. For example, the OOB signaling may allow for reduced interference, lower power FAP registration, macrocell offloading, and so on. Further, the integration of OOB functionality with the FAP 125 may allow the mobile devices 115 associated with the FAP 125 to also be part of an OOB piconet. The piconet may facilitate enhanced HNB functionality, other communications services, power management functionality, and/or other features to the mobile devices 115. These and other features will be further appreciated from the description below.

Figure 2:
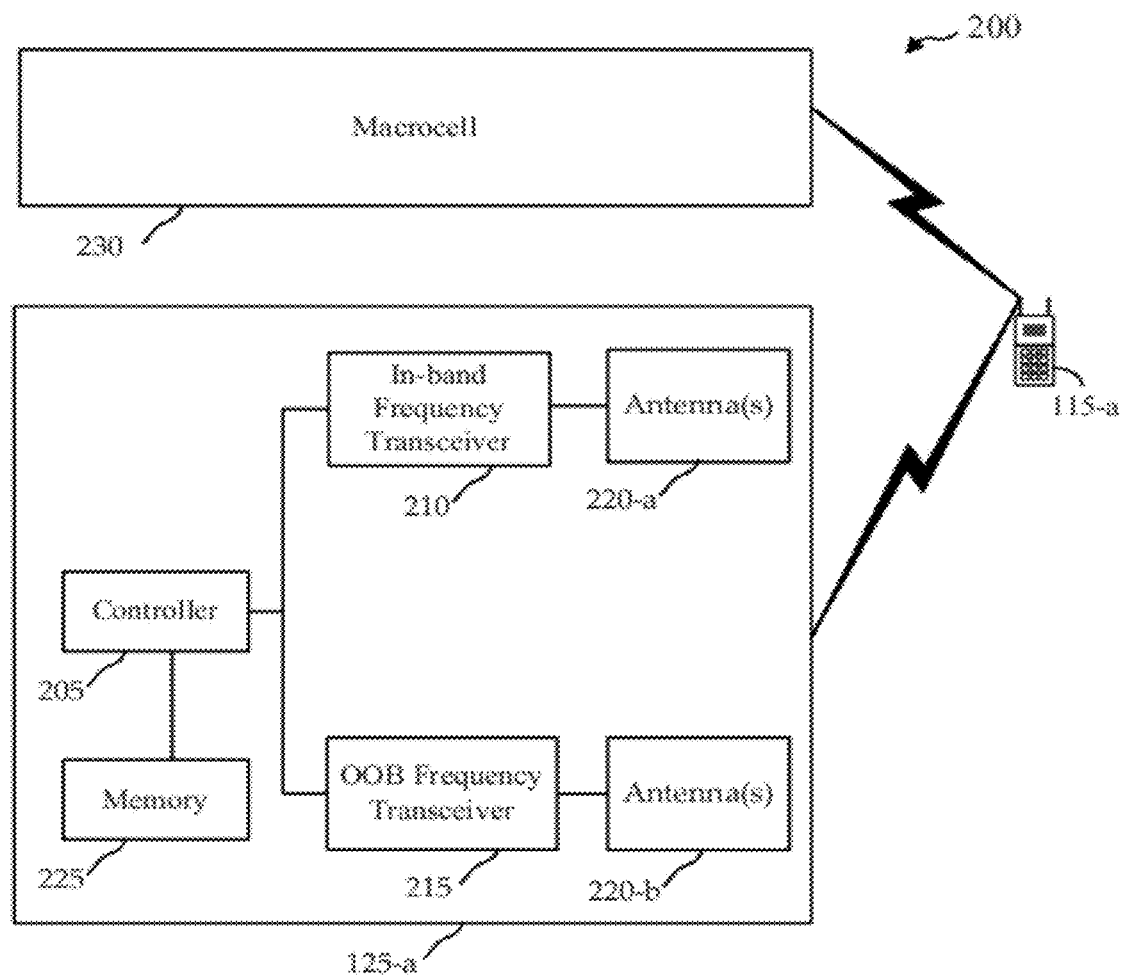
FIG. 2 illustrates a block diagram of a mobile device in communication with a macrocell, and with a femtocell that includes an OOB interface.

FIG. 2 is a block diagram of a wireless communications system 200 that includes OOB capabilities. This system 200 may be an example of the system 100 depicted in FIG. 1. The system 200 includes a mobile device 115-*a* and a FAP 125-*a*. The FAP 125-*a* may include a controller 205, memory 225, an in-band frequency transceiver 210, and OOB frequency transceiver 215, and antennas 220. The system 220 also includes macrocell 230 which may include various devices and/or functionality of a macrocell (e.g., it may represent a radio network controller (RNC) and a Node B, or be an enhanced Node B (eNB)). The mobile device 115-*a* may communicate bi-directionally with the macrocell via in-band links, and may communicate bi-directionally with the FAP 125-*a* via in-band or OOB links.

The components of the FAP 125-*a* (including the controller 205) may, individually or collectively, be implemented, in whole or in part, with instructions embodied in a memory, formatted to be executed by one or more general or application-specific processors. They may also be implemented with one or more application specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art.

The memory 225 may include random access memory (RAM) and read-only memory (ROM). In some examples, the memory 225 includes (or is in communication with) a data store configured to store mappings. As described more fully below, these mappings are used to facilitate certain FAP-assisted hand-in functionality. Typically the mappings map an identifier of a mobile device 115 (e.g., the International Mobile Subscriber Identity (IMSI) associated with the UE's 115 SIM card) with an OOB identifier corresponding to the mobile devices 115 OOB radio (e.g., the mobile device's 115 Bluetooth address). The memory 225 may also include registration information at the FAP 125-*a* for various mobile devices 115. The memory 225 may also store computer-readable, computer-executable software code containing instructions that are configured to, when executed, cause the controller to perform various functions described herein (e.g., call processing, database management, message routing, etc.). Alternatively, the software is not directly executable by the controller 205, but may be configured to cause the computer, e.g., when compiled and executed, to perform functions described herein.

The transceiver modules 210, 215 may each include a modem configured to modulate the packets and provide the modulated packets to the antennas 220 for transmission, and to demodulate packets received from the antennas 220. While some examples of the FAP 125-*a* may include a single antenna 220, there may be multiple antennas 220 for multiple links.

The macrocell 230 may trigger an OOB search by the mobile device 115-*a*. This may occur when a macrocell 230 sends a proximity detection configuration message to a mobile device 115-*a*. This may be in form of a measurement control message sent from an RNC to the mobile device 115-*a* indicating a carrier subscriber group (CSG) proximity detection. The OOB search from the mobile device 115-*a* may be triggered by global positional system information or information from neighboring macrocells. The mobile device 115-*a* may include an OOB transceiver (e.g., a Bluetooth transceiver, although there may be a range of alternative OOB signals used in other examples). The mobile device 115-*a* may initiate a Bluetooth page scan state to perform the search. The OOB frequency transceiver 215 of the FAP 125-*a* may be configured to transmit Bluetooth page messages. Note that in other examples, the OOB frequency transceiver 215 may be configured to transmit or receive other types of OOB discovery signals (e.g., entering Bluetooth page scan, inquiry, or inquiry scan states). The controller 205 may control the interval, frequencies, messages, etc. used by the OOB frequency transceiver 215 in the transmission or reception of OOB signals. The controller 205 may monitor the OOB signaling from or to the OOB frequency transceiver 215, and detect the presence of a mobile device 115-*a* based on this monitoring.

With the presence of mobile device 115-*a* detected at the FAP 125-*a*, the controller 205 may retrieve certain femtocell information for transmission to the mobile device 115-*a* using the OOB frequency transceiver 215. This may include the applicable primary scrambling code (PSC), a cell ID, a closed subscriber group (CSG) ID, CSG membership information, and HNB access mode (open, closed, or hybrid) at the femtocell.

The mobile device 115-*a* may receive, and store the received femtocell information. All or part of the femtocell information may be transmitted to macrocell 230 (e.g., including information in a measurement report to the macrocell 230). The mobile device 115-*a* may then receive instructions from the macrocell 230 to search for the femtocell (e.g., identifying frequency ranges and measurements gaps). Note that there may be both intra-frequency and inter-frequency scenarios. For inter-frequency scenarios, the instructions may direct the mobile device 115-*a* to search for the femtocell by tuning its receiver to other frequencies while the mobile device 115-*a* is still in connected mode on the macrocell 230. The time periods for these searches may be referred to as compressed/measurement gaps when the network provides specific gaps in the instructions. Autonomous gaps are the periods used when the mobile device 115-*a* has received permission from the network to tune away from the macrocell autonomously whenever the opportunity arises. The mobile device 115-*a* is said to be operating in compressed mode when it uses these gaps. The mobile device 115-*a* may then search for the FAP 125-*a* as directed by the macrocell 230, and the mobile device 115-*a* may exchange communications signals in the femtocell frequency range with the FAP 125-*a* using the in-band frequency transceiver 220. There may then be a macrocell 230 to femtocell hand-in of the mobile device.

The FAP 125-*a* may be in communication with other interfaces not explicitly shown in FIG. 2. For example, the FAP 125-*a* may be in communication with a native cellular interface as part of the in-band frequency transceiver 210 (e.g., a specialized transceiver utilizing cellular network communication techniques that may consume relatively large amounts of power in operation) for communicating with various appropriately configured devices, through a native cellular wireless link (e.g., an "in band" communication link). Such a communication interface may operate according to various communication standards, including but not limited to wideband code division multiple access (W-CDMA), CDMA2000, global system for mobile telecommunication (GSM), worldwide interoperability for microwave access (WiMax), and wireless LAN (WLAN). Also or alternatively, the FAP 125-*a* may be in communication with one or more backend network interfaces (e.g., a backhaul interface providing communication via the Internet, a packet switched network, a switched network, a radio network, a control network, a wired link, and/or the like) for communicating with various devices or other networks. The FAP 125-*a* may be a single device, or may be implemented with a number of devices in communication with each other.

Figure 3:
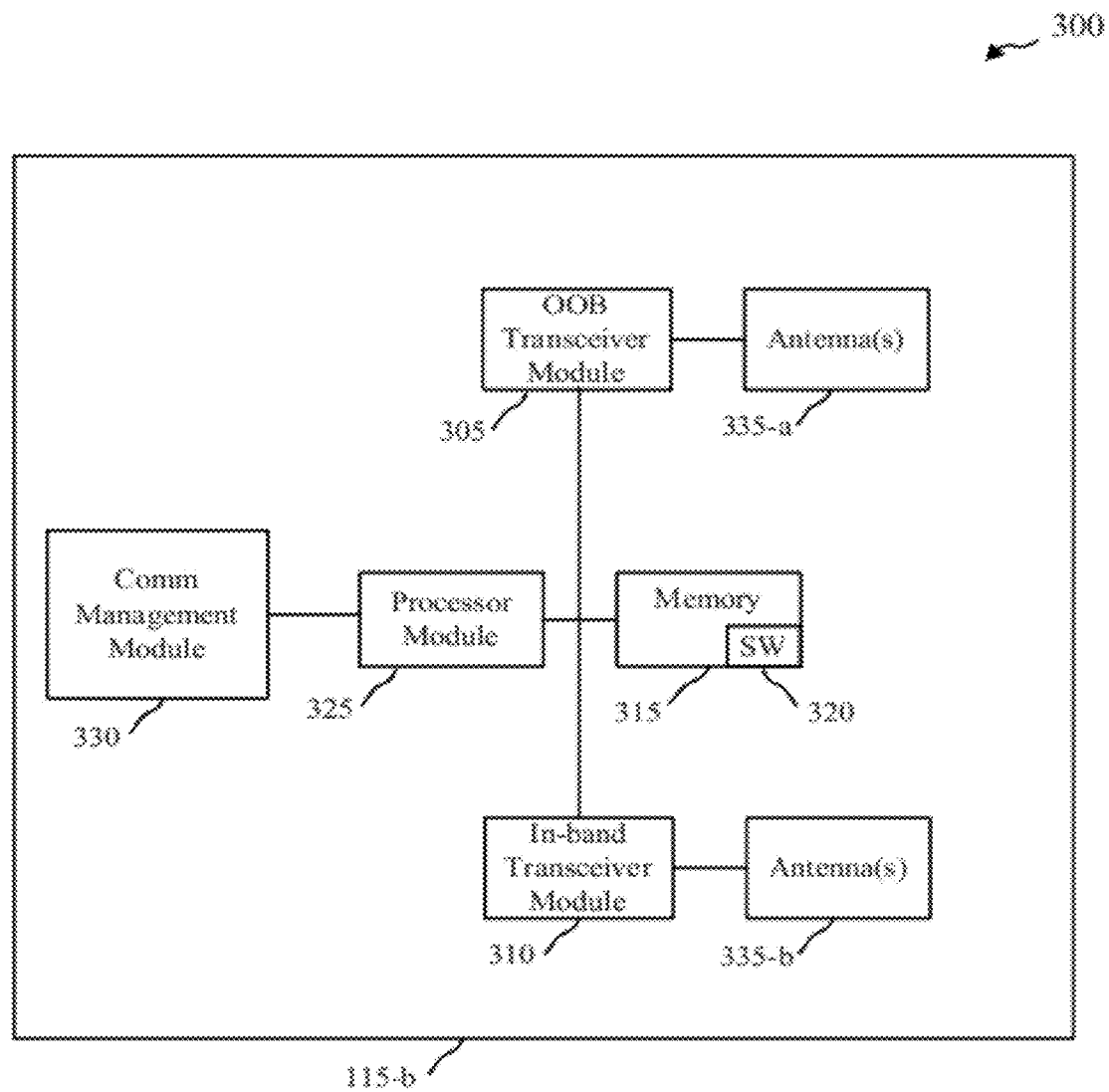
FIG. 3 illustrates a block diagram of a femtocell that includes an OOB transceiver.

FIG. 3 is a block diagram 300 of a mobile device 115-*b*. This may be the mobile device 115 of FIG. 1 or 2. The mobile device 115-*b* may be a smartphone, laptop computer, netbook computer, tablet, cellular telephone, PDA, internet appliance, gaming console, e-readers, etc. The mobile device 115-*b* may have an internal power supply (not shown), such as a small battery, to facilitate mobile operation.

The mobile device 115-*b* includes antennas 335, an in-band transceiver module 310, an OOB transceiver module 305, memory 315, and a processor module 325, which each may be in communication, directly or indirectly, with each other (e.g., via one or more buses). The transceiver modules 305, 310 are configured to communicate bi-directionally, via the antennas 335 with femtocells and macrocells. For example, the in-band transceiver module 310 may be configured to communicate bi-directionally with macrocell base stations 105 of a macrocell of FIG. 1 or 2, and with the FAP 125 of FIG. 1 or 2. The OOB transceiver module 305 may be configured to communicate bi-directionally with the FAP 125 of FIG. 1 or 2. Each transceiver module 305, 310 may include a modem configured to modulate the packets and provide the modulated packets to the antennas 335 for transmission, and to demodulate packets received from the antennas 335. While the mobile device 115-*b* may include a single antenna, the mobile device 115-*b* will typically include multiple antennas 335 for multiple links.

As generally referenced above, the OOB transceiver module 305 may be configured to communicate with a femtocell over one or more OOB links. In one example, the mobile device 115-*b* is in connected mode communicating with a macrocell to begin the process. The macrocell may trigger an OOB search by the mobile device 115-*b*, as the mobile device 115-*b* may receive a proximity detection configuration message from the macrocell via the in-band transceiver module 310. This may be in the form of a measurement control message sent from an RNC indicating a carrier subscriber group (CSG) proximity detection. Note that the OOB search from the mobile device 115-*b* may be triggered by global positional system information or information from neighboring macrocells.

The OOB transceiver module 305 at the mobile device 115-*b* may include a Bluetooth transceiver. The OOB transceiver module 305 may initiate a Bluetooth page scan state to perform the search (although a variety of other OOB discovery techniques may be used in other examples). Note that in other embodiments, the OOB transceiver module 305 may be configured to transmit or receive other types of OOB discovery signals (e.g., entering Bluetooth page scan, inquiry, or inquiry scan states). The processor module 325 may control the interval, frequencies, messages, etc. used by the OOB transceiver module 305 in the transmission or reception of OOB signals. The processor module 325 may monitor the OOB signaling from or to the OOB transceiver module 305, and detect the presence of a femtocell based on this monitoring. A femtocell may be configured to transmit or receive OOB discovery messages (e.g., Bluetooth page messages), and described in more detail with reference to FIG. 2.

With the presence of the femtocell detected by the mobile device 115-b via the OOB transceiver module 305, the processor module 325 may retrieve certain femtocell information from the femtocell using the OOB transceiver module 305. This may include the applicable primary scrambling code (PSC), a cell ID, a CSG ID, CSG membership information, and the HNB access mode (open, closed, or hybrid) at the femtocell. In other embodiments, the mobile device 115-b may already have all or part of this information stored, and thus may not need to retrieve it.

The mobile device 115-b may, therefore, store the femtocell information (regardless of when it was retrieved). All or part of the femtocell information may be transmitted to by the mobile device 115-b to a macrocell (e.g., including information in a measurement report) using the in-band transceiver module 310. The mobile device 115-b may then receive instructions from the macrocell via the in-band transceiver module to search for the femtocell (e.g., identifying frequency ranges and measurements gaps) via the in-band transceiver module 310. The instructions may direct the mobile device 115-b to search for the femtocell in compressed mode. The mobile device 115-b may then search for the femtocell as directed by the macrocell, and the mobile device 115-b and femtocell may exchange communications signals in the femtocell frequency range. The mobile device 115-b may perform the search via an inter-frequency or intra-frequency scan for neighboring cells. There may then be a macrocell to femtocell hand-in of the mobile device 115-b.

The memory 315 may include random access memory (RAM) and read-only memory (ROM). The memory 315 may store computer-readable, computer-executable software code 320 containing instructions that are configured to, when executed, cause the processor module 325 to perform various functions described herein (e.g., call processing, database management, message routing, etc.). Alternatively, the software 320 may not be directly executable by the processor module 325 but be configured to cause the computer (e.g., when compiled and executed) to perform functions described herein.

The processor module 325 may include an intelligent hardware device, e.g., a central processing unit (CPU) such as those made by Intel® Corporation or AMD®, a microcontroller, an application specific integrated circuit (ASIC), etc. The processor module 325 may include a speech encoder (not shown) configured to receive audio via a microphone, convert the audio into packets (e.g., 30 ms in length) representative of the received audio, provide the audio packets to the in-band transceiver module 310, and provide indications of whether a user is speaking. Alternatively, an encoder may only provide packets to the in-band transceiver module 310, with the provision or withholding/suppression of the packet itself providing the indication of whether a user is speaking.

According to the architecture of FIG. 3, the mobile device 115-b further includes a communications management module 330. The communications management module 330 may manage communications with a macrocell, femtocell, other mobile devices 115 (e.g., acting as a master of a secondary piconet), etc. By way of example, the communications management module 330 may be a component of the mobile device 115-b in communication with some or all of the other components of the mobile device 115-b via a bus. Alternatively, functionality of the communications management module 330 may be implemented as a component of a transceiver module 305, 310, as a computer program product, and/or as one or more controller elements of the processor module 325.

Notably, the mobile device 115-b may include a hybrid search mode. In this mode, am OOB search may be discontinued for a time period due to power savings or other reasons. In hybrid search mode, the OOB search for a femtocell (e.g., by the OOB transceiver module 305) may be switched to another state. For example, if the mobile device 115-b was operating in Bluetooth page scan mode, the page scan parameters may be changed for power saving reasons. Alternatively, if the mobile device 115-b was operating in Bluetooth page scan mode, the mobile device 115-b may be switched to a page, inquiry, or inquiry scan state. The time period that a mobile device 115-b is to operate in each may be configurable, or may be adapted to current user conditions (i.e., if the macrocell signal is very weak, a power saving mode may be avoided; whereas if a macrocell signal is strong, the proportional time that the OOB transceiver module 305 operates in power saving mode may be longer).

Figure 4:
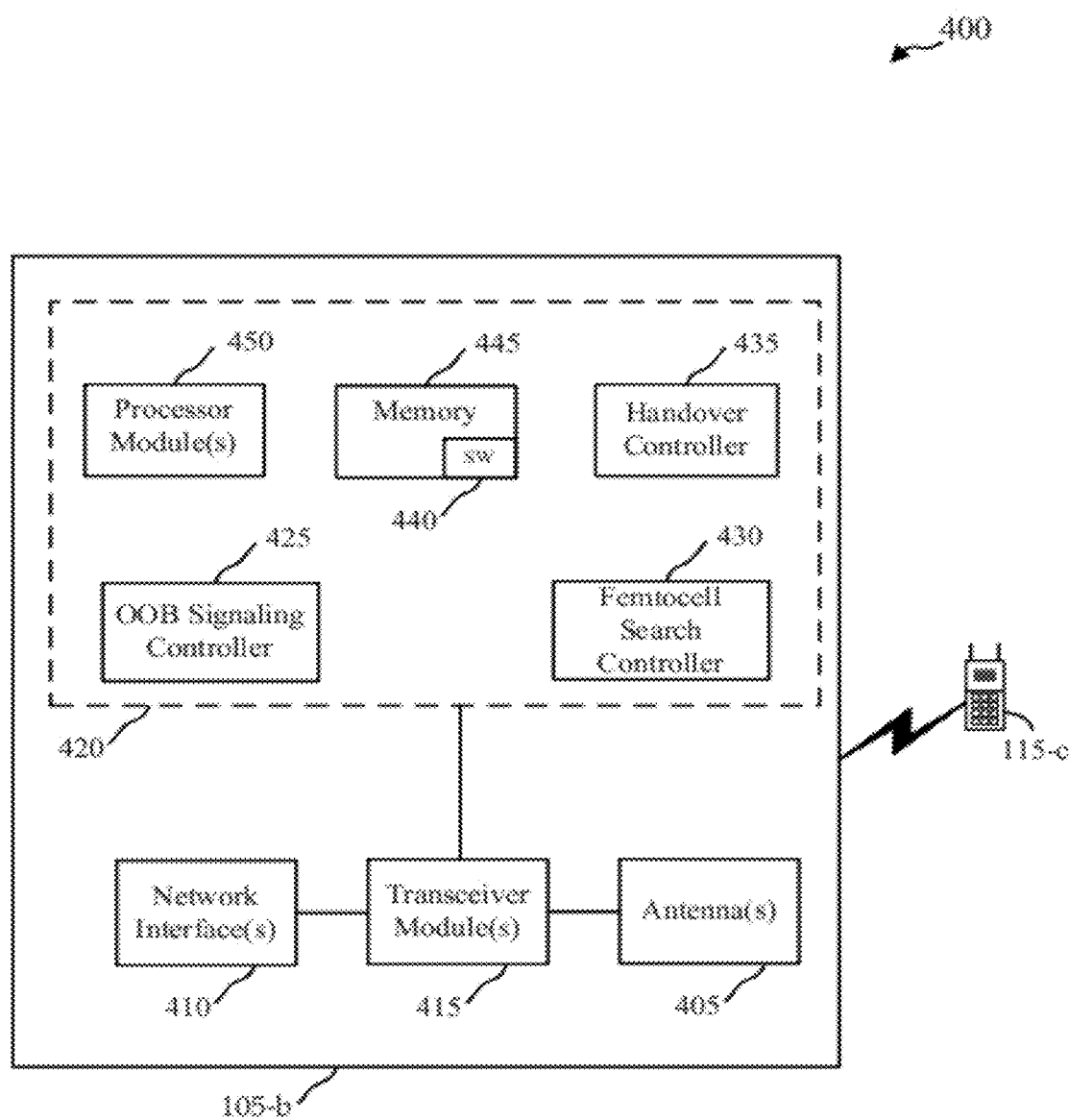
FIG. 4 illustrates a block diagram of a macrocell.

Turning next to FIG. 4, a block diagram illustrates a wireless communication system 400 which includes a mobile device 115-c and macrocell 105-b. The system 400 may be an example of the system 100, 200 described with reference to FIG. 1 or 2. Thus, the macrocell 105-b may be an example of the macrocell 105 of FIG. 1 or 2, and the mobile device 115-c may be an example of the mobile device 115 of FIG. 1, 2, or 3. Any subset of these components may be located in the controller 120 of FIG. 1, as well. The macrocell 115-c includes wireless (antenna(s) 405) and wired (network interface(s) 410) connectivity, and one or more transceiver module(s) 415. These communications components may be communicatively coupled with any subset of the following components 420: an OOB signaling controller 425, femtocell search controller 430, handover controller 435, memory 445 (software 440), and processor module(s) 450.

These components 420 of the macrocell 105-b may, individually or collectively, be implemented with one or more application specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one example, the mobile device 115-c is in connected mode communicating with a macrocell 105-b at the beginning of the process. The OOB signaling controller 425 may trigger an OOB search by the mobile device 115-*c*, transmitting a proximity detection configuration command via transceiver module(s) 415. Note that the OOB signaling controller 425 may trigger OOB searches by the mobile device 115-*c* based on global positional system information or information from neighboring macrocells. The mobile device 115-*c* may detect the presence of a femtocell based transmitting and/or receiving the OOB signals. With the presence and identity of the femtocell detected by the mobile device 115-*c* via the OOB signals, the mobile device 115-*c* may retrieve certain femtocell information from the femtocell. This may include the applicable primary scrambling code (PSC), frequency, applicable radio access technology ("RAT", e.g. UMTS, LTE), a cell ID, a closed subscriber group (CSG) ID, CSG membership information, and the access mode (open, closed, or hybrid) at the femtocell. In other embodiments, the mobile device 115-*c* may already have all or part of this information stored in memory 315 of FIG. 3, and thus may not need to retrieve it (i.e., this information can be accessed locally from memory based on an identification of the femtocell, and need not be retrieved via the OOB transceiver module 305 of FIG. 3).

The mobile device 115-*c* may transmit all or part of the femtocell information to the macrocell 105-*b*, for processing by the femtocell search controller 430 and/or the processor module(s) 450. The femtocell search controller 430 may then generate instructions to search for the femtocell (e.g., identifying frequency ranges and measurements gaps), and transmit the instructions to the mobile device 115-*c* via the transceiver module(s) 415. The instructions may direct the mobile device 115-*c* to search for the femtocell in compressed mode. The mobile device 115-*c* may then search for the femtocell, and the mobile device 115-*c* may exchange communications signals with the femtocell in the in-band femtocell frequency range. The mobile device 115-*c* may perform the search via an inter-frequency or intra-frequency scan for cell reselection. There may then be a macrocell to femtocell hand-in of the mobile device 115-*c* as set up by the handover controller 435.

Figure 5:
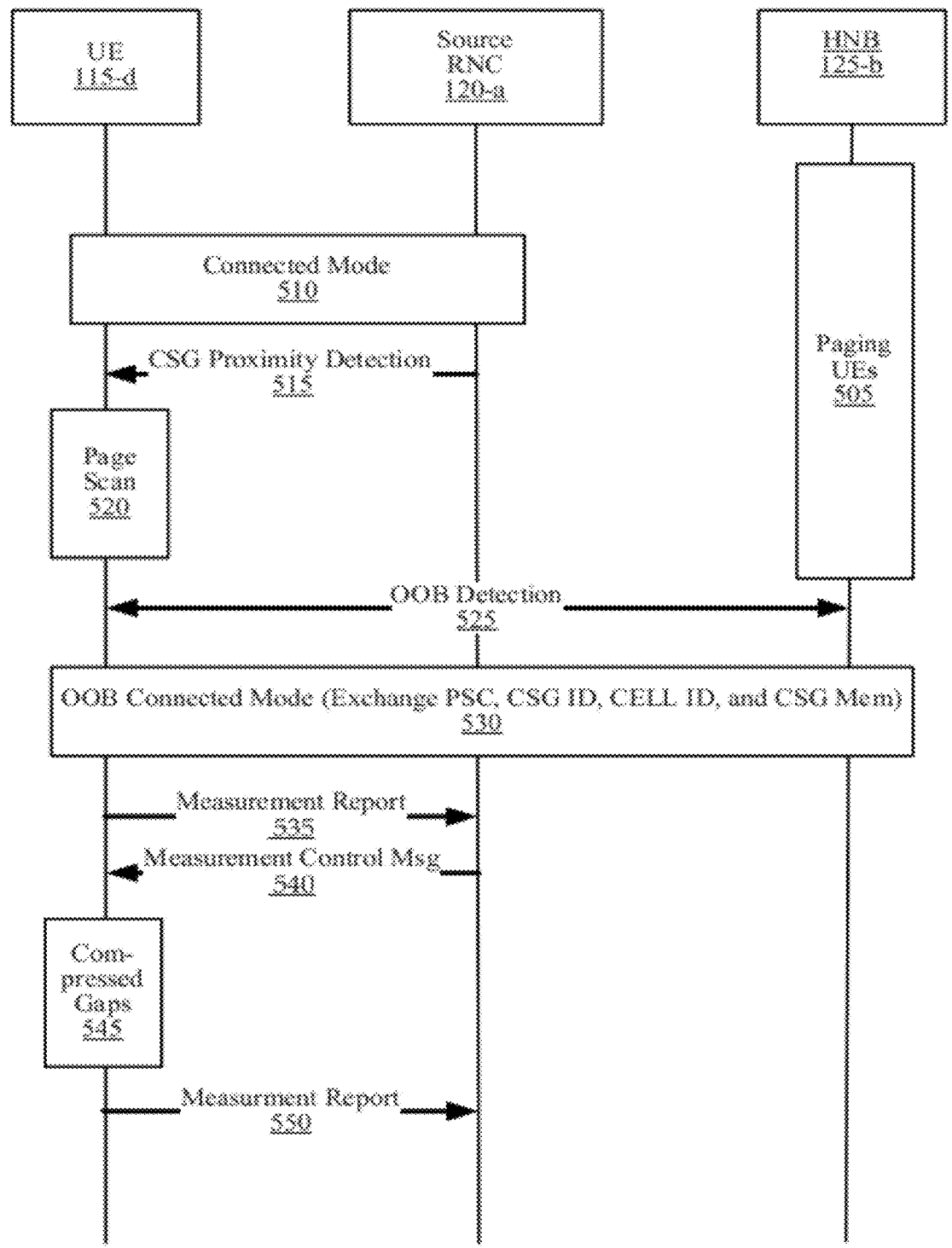

Turning next to FIG. 5, a flow diagram 500 illustrates a method for femtocell detection in a 3GPP network, which includes a UE 115-*d*, source RNC (SRNC) 120-*a*, and HNB 125-*b*. The HNB 125-*b* may transmit page messages 505, while the UE 115-*d* is in connected mode 510 with the SRNC 120-*a*. The page messages 505 may be Bluetooth page messages, and each of the UE 115-*d* and the HNB 125-*b* may have a unique Bluetooth device address (BD_ADDR) that may be used for paging the other device (e.g., HNB 125-*b* pages the UE 115-*d*). In some cases, an initial association may be required between the HNB 125-*b* and UE 115-*d* to exchange BD_ADDRs for future paging purposes.

The SRNC 120-*a* may transmit a measurement report message including a CSG proximity detection configuration command 515 to the UE 115-*d*. This CSG proximity detection configuration command 515 may trigger the UE 115-*d* to enter page scan mode 520, and detect 525 the HNB 125-*b* over an OOB link (e.g., by identifying the page messages sent by the HNB 125-*b*). The UE 115-*d* and HNB 125-*b* enter an OOB connected mode 530 (e.g., via Bluetooth), and the UE 115-*d* may retrieve PSC, CSG ID, CELL ID, and CSG membership information from the HNB 125-*b* using the OOB connection.

If the CSG ID matches a CSG ID in the UE 115-*d* allowed CSG list, the UE 115-*d* may transmit a measurement report 535 with a CSG proximity indication to the SRNC 120-*a*, and may transmit the frequency and RAT of the HNB 125-*b* to SRNC 120-*a*. The SRNC 120-*a* may respond to the measurement report by sending a measurement control message 540 to the UE 115-*d* identifying frequency information, PSC of a particular cell and in case of inter-frequency searches, measurement gaps for the UE 115-*d* to use in the search and identification of the cell.

The UE 115-*d* may perform a scan for the HNB 125-*b* according to the measurement control message 540, entering compressed mode 545 for the scan. Once the UE 115-*d* finds the cell using the in-band link, a measurement report 550 is sent from the UE 115-*d* to the SRNC 120-*a* with the PSC information and power measured on the HNB 125-*b*. In addition, for intra-frequency scenarios, the UE 115-*d* may send CELL ID, CSG ID and CSG membership information to the SRNC 120-*a* in the measurement report. For inter-frequency scenarios, a measurement control message (not shown) is sent from the SRNC 120-*a* to the UE 115-*d* indicating a request for system information (SI) acquisition. SI acquisition information may require that the UE 115-*d* decode specified in-band control channels on the HNB 125-*b*, so autonomous gaps may be needed for acquisition. Since in 530, SI such as CSG ID, CELL ID and CSG membership has been previously received over the OOB link with the HNB 125-*b*, the UE 115-*d* may not need to observe the "autonomous" gaps. This avoids the degradation in performance that can be caused by turning away the UE receiver from the macrocell served by the SRNC 120-*a* to decode channels on the HNB 125-*b*. Hence, a measurement report may be sent immediately from the UE 115-*d* to the SRNC 120-*a* with PSC, CELL ID, CSG ID, and CSG membership information. For both inter-frequency and intra-frequency scenarios, once the SRNC 120-*a* receives the SI information and power measurements on the HNB 125-*b*, it proceeds to evaluate the information received from UE 115-*d* (e.g. in case the power measured on the HNB 125-*b* by UE 115-*d* is above a threshold and the UE is allowed on the HNB 125-*b*, a handover 550 from the SRNC 120-*a* to the HNB 125-*b* may be initiated by communicating with the core network to set-up resources at the HNB 125-*b*.

Figure 6A:
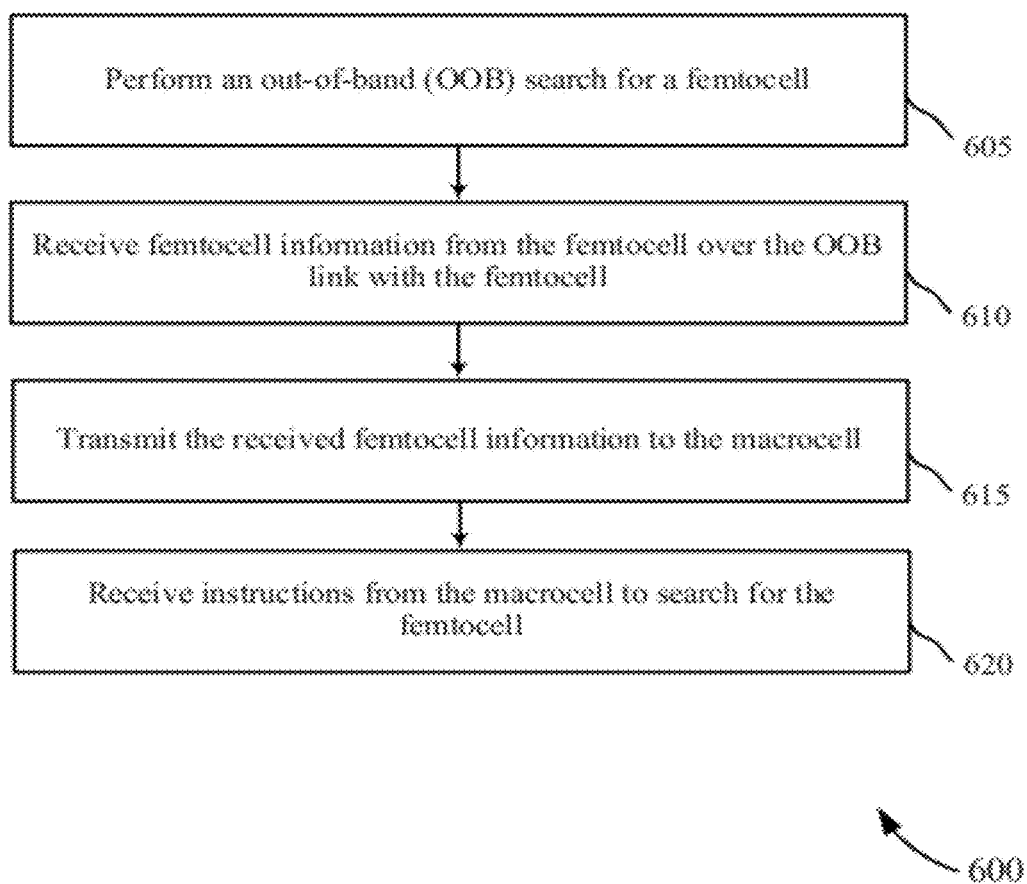
FIG. 6A is a flowchart illustrating an OOB assisted search for a femtocell.

Turning to FIG. 6A, a flowchart illustrates a method 600 for an OOB assisted search for a femtocell. The method 600 may, for example, be performed by the mobile device 115 of FIG. 1, 2, 3, or 4, or using any combination of the devices described for these figures.

At block 605, an OOB search for a femtocell is performed. At block 610, femtocell information is received from the femtocell over the OOB link with the femtocell. At block 615, received femtocell information is transmitted to the macrocell. This may be all or part of the received femtocell information. At block 620, instructions from the macrocell to search for the femtocell are received.

Figure 6B:
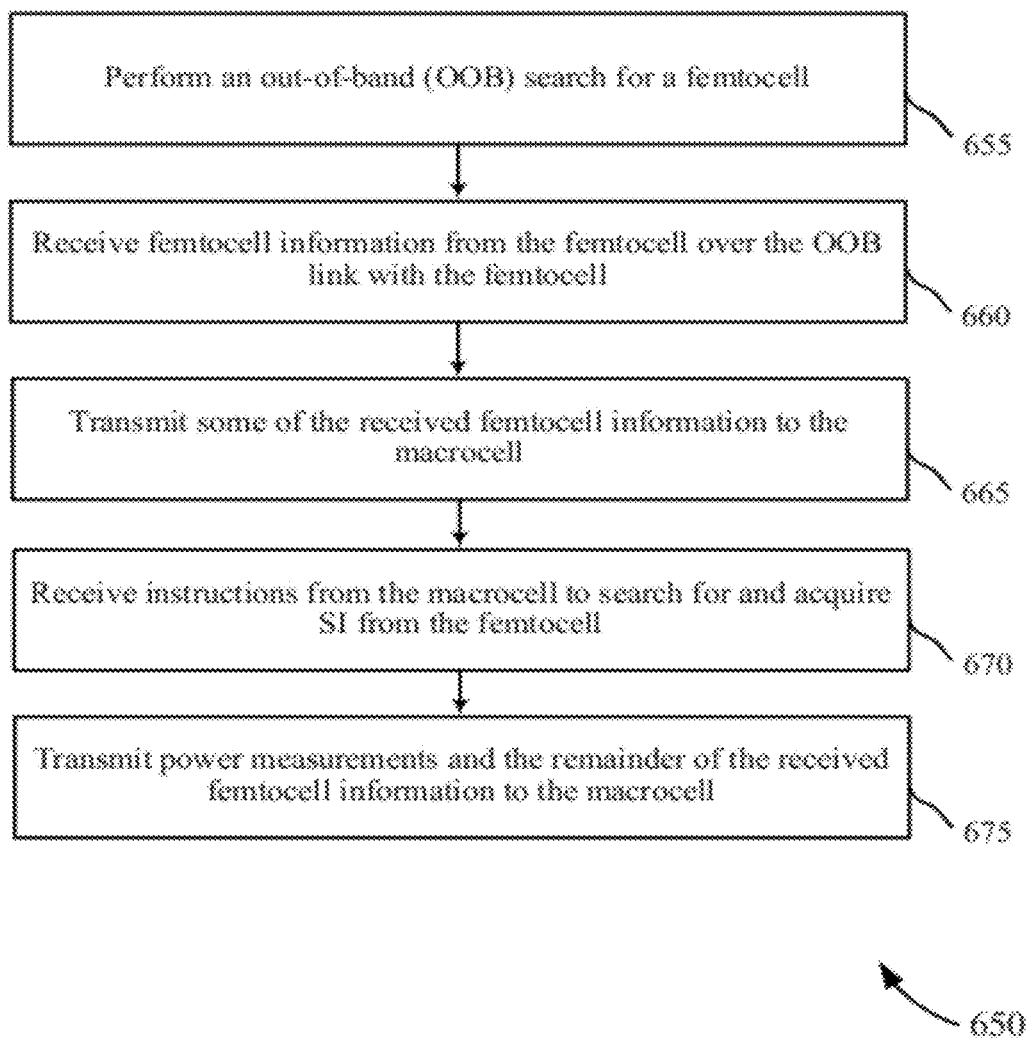
FIG. 6B is a flowchart illustrating an alternative example of an OOB assisted search for a femtocell.

Turning to FIG. 6B, a flowchart illustrates a method 650 for an OOB assisted search for a femtocell. This may be the method 600 of FIG. 6A. The method 650 may, for example, be performed by the mobile device 115 of FIG. 1, 2, 3, or 4, or using any combination of the devices described for these figures.

At block 655, an OOB search for a femtocell is performed. At block 660, femtocell information is received from the femtocell over the OOB link. At block 665, some of the received femtocell information (e.g., the frequency and RAT information) is transmitted to the macrocell. At block 670, instructions from the macrocell to search for and acquire SI from the femtocell are received. At block 675, the power measurements and remaining femtocell information obtained in block 660 are transmitted to the macrocell.

Figure 7:
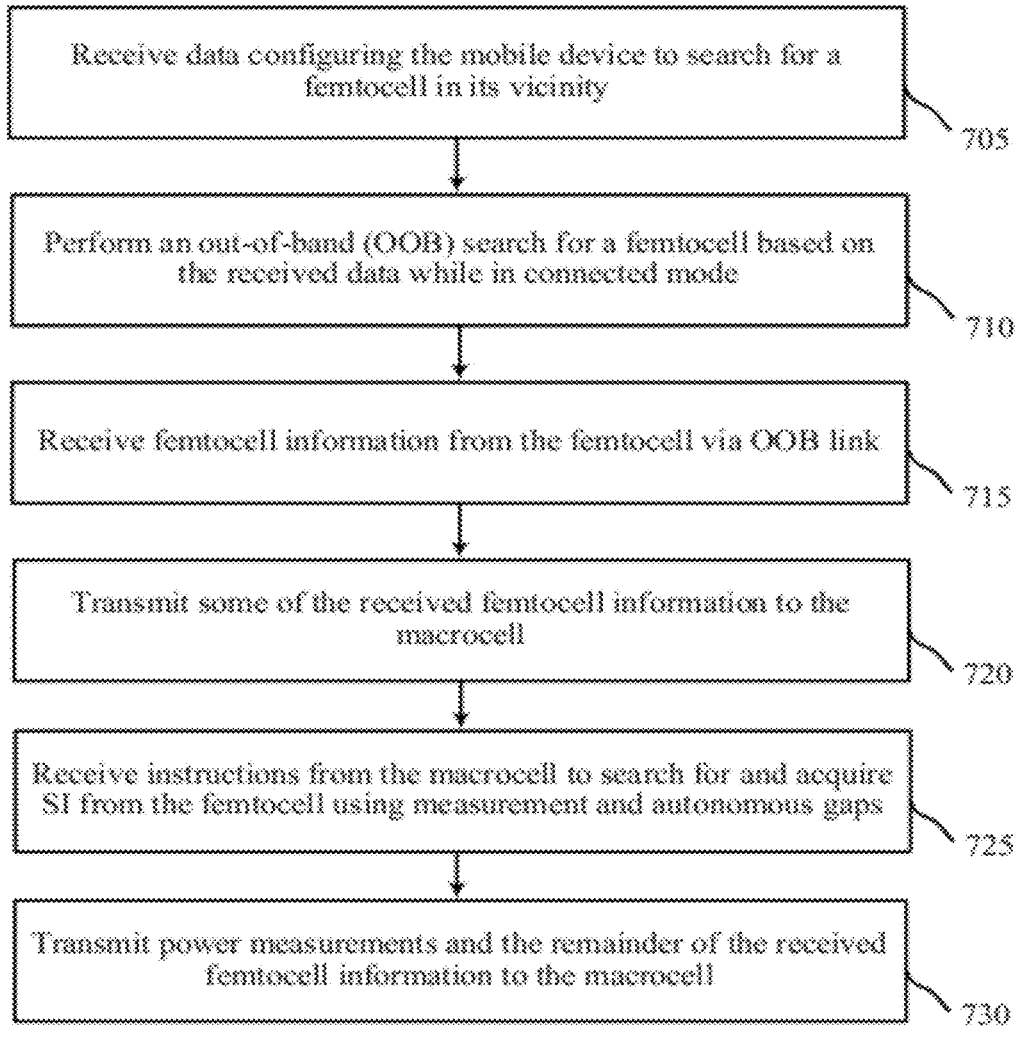
FIG. 7 is a flowchart illustrating an OOB assisted search in compressed mode for a femtocell.

Turning to FIG. 7, a flowchart illustrates a method 700 for an OOB assisted search in compressed mode for a femtocell. The method 700 may, for example, be performed by the mobile device 115 of FIG. 1, 2, 3, or 4, or using any combination of the devices described for these figures. The method 700 may be an example of the methods 600, 650 described with reference to FIG. 6A or 6B.

At block 705, data configuring the mobile device to search for a femtocell in its vicinity is received. At block 710, an OOB search for a femtocell is performed based on the received data, and while the mobile device is in connected mode. At block 715, femtocell information is received from the femtocell via OOB signals. At block 720, some of the received femtocell information is transmitted to the macrocell. At block 725, instructions from the macrocell to search for and acquire SI from the femtocell using measurement and autonomous gaps are received. At block 730, the power measurements and the remaining femtocell information obtained in block 715 are sent to the macrocell.

Figure 8:
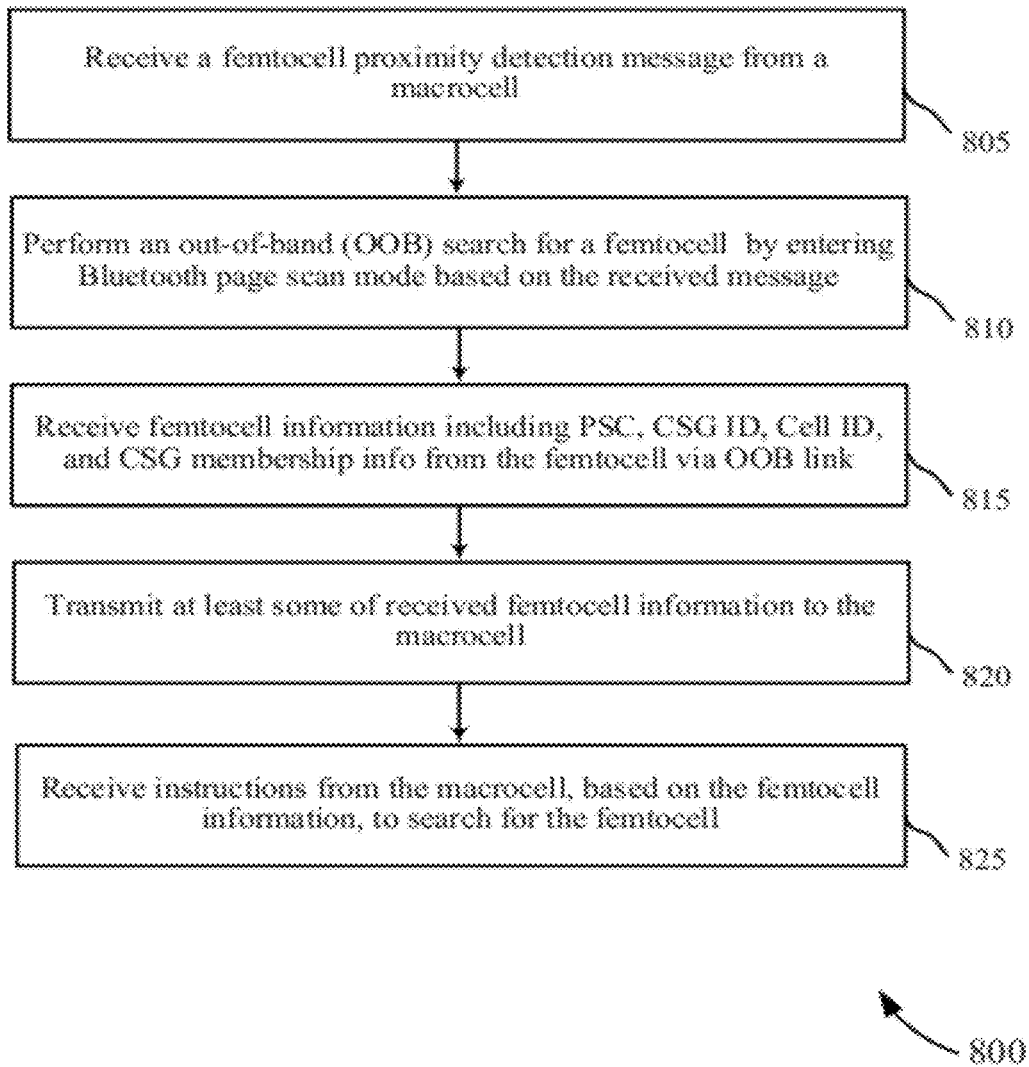
FIG. 8 is a flowchart illustrating a method for transmitting information retrieved by a femtocell to a macrocell to facilitate a search.

Turning to FIG. 8, a flowchart illustrates a method 800 for transmitting information retrieved by a femtocell to a macrocell to facilitate a search. The method 800 may, for example, be performed by the mobile device 115 of FIG. 1, 2, 3, or 4, or using any combination of the devices described for these figures. The method 800 may be an example of the methods 600, 650, 700 described with reference to FIG. 6A, 6B, or 7.

At block 805, a femtocell proximity detection configuration message from a macrocell is received. At block 810, an OOB search for a femtocell is performed by entering Bluetooth page scan mode based on the received message. At block 815, femtocell information is received over the OOB link from the femtocell, including PSC, CSG ID, Cell ID, and CSG membership info. At block 820, at least some of the received femtocell information is transmitted to the macrocell. At block 825, instructions from the macrocell, based on the femtocell information, are received to search for the femtocell. Additional information (e.g., power measurements) may be transmitted (not shown) to the macrocell after block 825.

Figure 9:
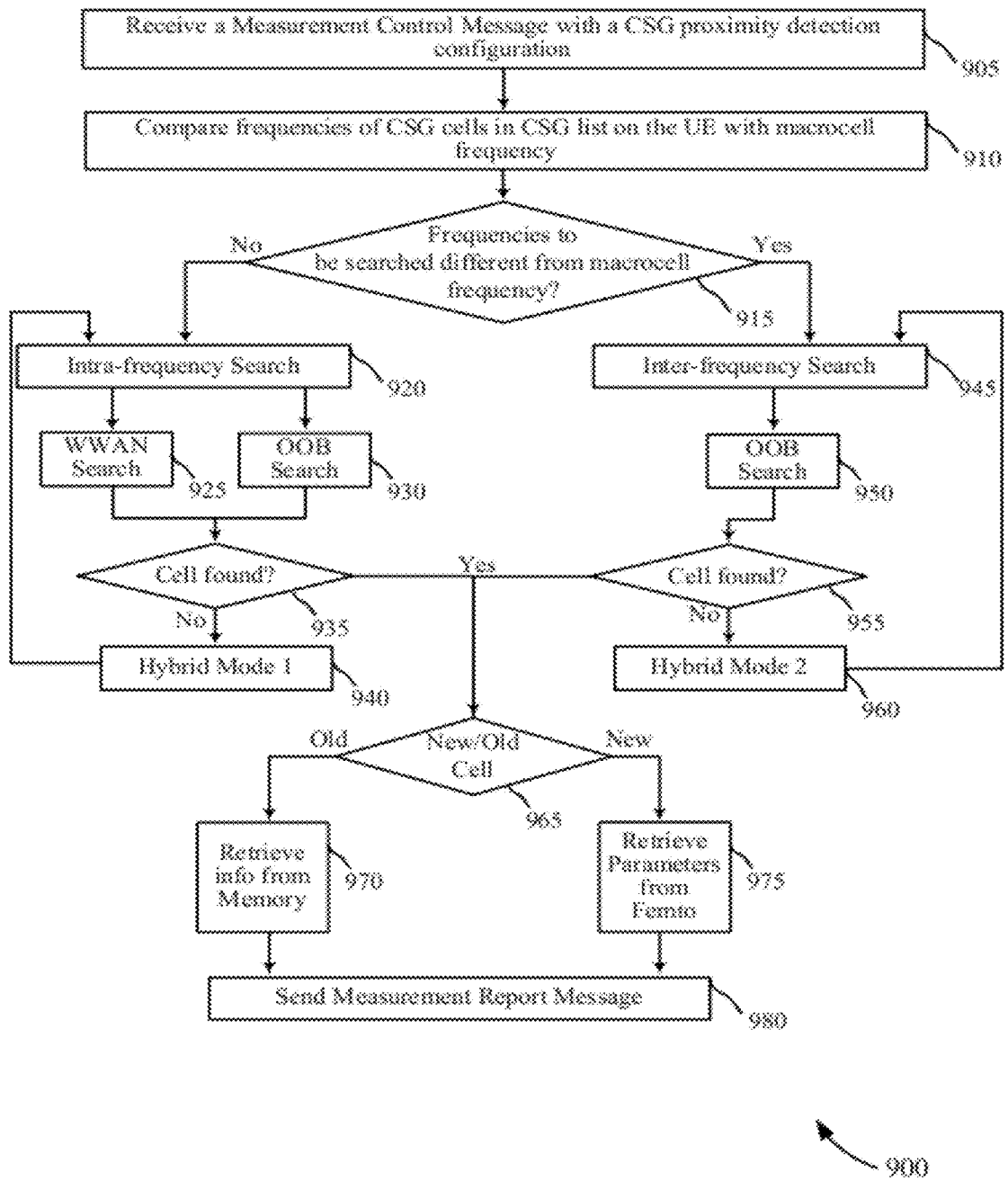
FIG. 9 is a flowchart illustrating steps for inter-frequency and intra-frequency searches.

Turning to FIG. 9, a flowchart illustrates a method 900 for inter-frequency and intra-frequency searches. The method 900 may, for example, be performed by the mobile device 115 of FIG. 1, 2, 3, or 4, or using any combination of the devices described for these figures. The method 900 may be an example of the method 600, 650, 700, 800 described with reference to FIG. 6A, 6B, 7, or 8.

At block 905, a measurement control message is received with a CSG proximity detection configuration. At block 910, the frequencies of CSG cells in a CSG list on the UE are compared with the macrocell frequency. At block 915, for each frequency that needs to searched a determination is made as to whether or not that frequency is different from the macrocell frequency. If the frequency is the same as the macrocell frequency, then an intra-frequency search is performed at block 920. This may include a search 925 in the in-band macrocell frequency (WWAN) for cells in both the neighbor cell list and CSG list as opposed to typical in-band cell searches which are based on neighbor cell list only. This intra-frequency search may also include an OOB search 930 in the non-macrocell frequencies, the search based on a CSG list. A combination of the WWAN and the OOB searches may help ensure that intra-frequency CSG cells would be identified as soon as possible.

At block 935, after a first time duration for the WWAN search 925 and OOB search 930, a determination is made whether a cell has been found. If the cell has not been found, the mobile device may enter hybrid mode 1 at block 940. Hybrid mode 1 may be a lower powered state (e.g. by changing the parameters of page scan) or another mode to improve the opportunities of finding the femtocell (e.g., if a mobile device was in page scan mode, it may be switched to another mode, such as page, inquiry, or inquiry scan mode). In one example, in hybrid mode 1, the WWAN search may be continued, and the power saving mode or different mode for the OOB search may be used for a second time duration (which may be the same, or different, from the first time duration). After the second time duration, the method may return to block 920.

If a cell is found during the intra-frequency search, a determination is made at block 965 whether the cell is a new or old cell. At block 970, for old cells, available information from the memory is retrieved. At block 975, for new cells, parameters from the femtocell are retrieved. At block 980, a measurement report message is sent (e.g., to the RNC).

If, at block 915 it is determined that the CSG frequency being searched is different from the macrocell frequency, then an inter-frequency search is performed at block 945. This may be an OOB search 950 in the non-macrocell frequencies, the search based on a CSG list. As aforementioned, this allows the UE maintain its connection on the macrocell while searching for CSG cells on the OOB link, otherwise, the UE may have to tune its receiver to other non-macrocell frequencies and search for CSG cells with degradation to the ongoing call on the macrocell.

At block 955, after a first time duration for the OOB search 950, a determination is made whether a cell has been found. If the cell has not been found, the mobile device may enter hybrid mode 2 at block 960. Hybrid mode 2 may be a lower powered state (e.g. by changing the parameters of page scan) or another mode to improve the opportunities of finding the femtocell (e.g., if a mobile device was in page scan mode, it may be switched to another mode, such as page, inquiry, or inquiry scan mode). In one example, in hybrid mode 2, the power saving mode or another mode for the OOB search may be used for a second time duration (which may be the same, or different, from the first time duration). After the second time duration, the method may return to block 945.

If a cell is found during the inter-frequency search, a determination is made at block 965 whether the cell is a new or old cell. At block 970, for old cells, available information from the memory is retrieved. At block 975, for new cells, parameters from the femtocell are retrieved. At block 980, a measurement report message is sent (e.g., to the RNC).

Figure 10:
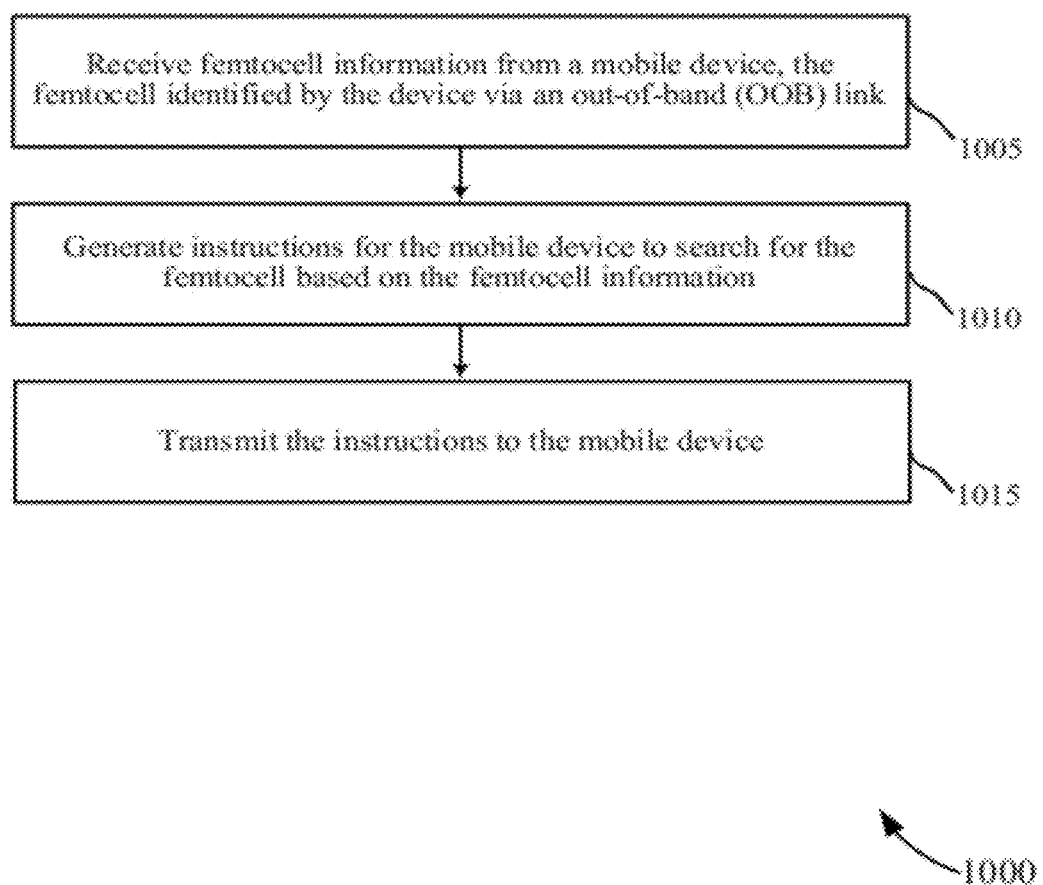
FIG. 10 is a flowchart illustrating a macrocell assisted search for a femtocell.

Turning to FIG. 10, a flowchart illustrates a method 1000 for a macrocell assisted search for a femtocell. The method 1000 may, for example, be performed by base station 105 of FIG. 1, 2, or 4, or using any combination of the devices described for these figures.

At block 1005, femtocell information is received from a mobile device, the femtocell identified by the mobile device via an OOB link. This may be the information transmitted from the mobile device at block 615, 665, or 720. At block 1010, instructions are generated for the mobile device to search for the femtocell based on the femtocell information. These instructions may include instructions to acquire SI from the femtocell. At block 1015, the instructions are transmitted to the mobile device. After these instructions are transmitted at block 1015, power measurements and additional femtocell information may be received (not shown) from the mobile device.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

The detailed description set forth above in connection with the appended drawings describes examples and does not represent the only embodiments that may be implemented or that are within the scope of the claims. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the description is not to be limited to the examples and designs described herein, but is to be accorded the widest scope consistent with the principles and novel features disclosed herein.

The invention claimed is:

1. A method for femtocell discovery by a mobile device being served by a macrocell, the method comprising:

receiving data instructing the mobile device to perform an out-of-band (OOB) search for a femtocell in its vicinity, the data comprising a proximity detection configuration command indicating that the macrocell has detected a femtocell in a proximity of the mobile device;

performing the OOB search for the femtocell in response to the received data, the femtocell configured to operate in a first frequency band and a second frequency band different from the first frequency band, the OOB search comprising a search that is OOB with respect to the macrocell and the second frequency band;

establishing an OOB link with the femtocell based on the OOB search, the OOB link comprising at least a part of the first frequency band;

receiving femtocell information from a femtocell access point via the OOB link with the femtocell;

transmitting the femtocell information received via the OOB link to the macrocell; and receiving instructions from the macrocell to perform an in-band search for the femtocell based on the femtocell information received via the OOB link, the in-band search comprising a search within the second frequency band;

wherein the second frequency band comprises a frequency channel within a set of frequencies allocated to wireless wide area network communications available for use by the macrocell, and wherein the second frequency band is different than a frequency band in use by the macrocell.

2. The method of claim 1, wherein:

transmitting the femtocell information received via the OOB link to the macrocell comprises transmitting only a portion of a total amount of femtocell information received to the macrocell;

the instructions from the macrocell to perform the in-band search for the femtocell further comprise instructions from the macrocell to acquire system information from the femtocell; and the method further comprises transmitting power measurements and a remainder of the total amount of femtocell information to the macrocell.

3. The method of claim 1, wherein the OOB search is triggered by global positional system information or information from neighboring macrocells.

4. The method of claim 1, wherein performing the OOB search comprises: entering a Bluetooth page scan state.

5. The method of claim 1, wherein performing the OOB search comprises: entering a Bluetooth page, inquiry, or inquiry scan state.

6. The method of claim 1, wherein performing the OOB search comprises: entering a first OOB search state for a time period; and entering a second, power-saving OOB search state upon expiration of the time period, the second, power-saving OOB search associated with a lower power consumption rate than the first OOB search state.

7. The method of claim 1, wherein the receiving the femtocell information from the femtocell via the OOB link comprises:

receiving a primary scrambling code (PSC), frequency, radio access technology (RAT), a cell ID, a closed subscriber group (CSG) ID, and CSG membership information from the femtocell.

8. The method of claim 1, further comprising:

storing a primary scrambling code (PSC), frequency, radio access technology (RAT), a cell ID, a closed subscriber group (CSG) ID, and CSG membership information from each of a plurality of femtocells;

retrieving the stored PSC, frequency, RAT, cell ID, CSG ID, or CSG membership information for the femtocell in response to receiving the femtocell information; and transmitting the retrieved PSC, frequency, RAT, cell ID, CSG ID, or CSG membership information with the femtocell information to the macrocell.

9. The method of claim 1, wherein the first frequency band comprises a frequency channel within a set of frequencies allocated to unlicensed wireless communications.

10. The method of claim 1, wherein the performing the OOB search for the femtocell comprises:

performing the OOB search for the femtocell while the mobile device is in connected mode with the macrocell.

11. The method of claim 1, wherein instructions from the macrocell to perform the in-band search for the femtocell comprise instructions to the mobile device to search and acquire information on the femtocell in compressed mode.

12. A mobile device comprising: an out-of-band (OOB) transceiver module configured to: receive data instructing the mobile device to perform an out-of-band (OOB) search for a femtocell in its vicinity, the data comprising a proximity detection configuration command indicating that the macrocell has detected a femtocell in a proximity of the mobile device;

perform the OOB search for the femtocell in response to the received data, the femtocell configured to operate in a first frequency band and a second frequency band different from the first frequency band, the OOB search comprising a search that is OOB with respect to a macrocell and the second frequency band; and establish an OOB link with the femtocell based on the OOB search, the OOB link comprising at least a part of the first frequency band;

receive femtocell information from a femtocell access point via an OOB link with the femtocell; and an in-band transceiver module configured to:

transmit the femtocell information received via the OOB link to the macrocell serving the mobile device; and receive instructions from the macrocell to perform an in-band search for the femtocell based on the femtocell information received via the OOB link, the in-band search comprising a search within the second frequency band;

wherein the second frequency band comprises a frequency channel within a set of frequencies allocated to wireless wide area network communications available for use by the macrocell; and wherein the second frequency band is different than a frequency band in use by the macrocell.

13. The mobile device of claim 12, wherein the OOB search is triggered by global positional system information or information from neighboring macrocells.

14. The mobile device of claim 12, wherein, to perform the OOB search, the OOB transceiver module is configured to:

operate in a Bluetooth page scan state.

15. The mobile device of claim 12, wherein, to perform the OOB search, the OOB transceiver module is configured to:

operate in a Bluetooth page, inquiry, or inquiry scan state.

16. The mobile device of claim 12, wherein, to perform the OOB search, the OOB transceiver module is configured to:

operate in a first OOB search state for a time period; and operate in a second, power-saving OOB search state upon expiration of the time period, the second, power-saving OOB search associated with a lower power consumption rate than the first OOB search state.

17. The mobile device of claim 12, wherein the femtocell information comprises a primary scrambling code (PSC), frequency, radio access technology (RAT), a cell ID, a closed subscriber group (CSG) ID, and CSG membership.

18. The mobile device of claim 12, further comprising:

memory configured to store a primary scrambling code (PSC), frequency, radio access technology (RAT), a cell ID, a closed subscriber group (CSG) ID, and CSG membership information from each of a plurality of femtocells; and a processor module, communicatively coupled with the memory, the in-band transceiver, and the OOB transceiver, and configured to:

retrieve the stored PSC, frequency, RAT, cell ID, CSG ID, or CSG membership information for the femtocell based on the femtocell information; and forward the retrieved PSC, frequency, RAT, cell ID, CSG ID, or CSG membership information to the in-band transceiver for transmission to the macrocell.

19. The mobile device of claim 12, wherein the first frequency band comprises a frequency channel within a set of frequencies allocated to unlicensed wireless communications.

20. The mobile device of claim 12, wherein the OOB transceiver module performs the OOB search for the femtocell while the in-band transceiver operates in connected mode with the macrocell.

21. The mobile device of claim 12, wherein instructions from the macrocell to perform the in-band search for the femtocell comprise instructions for the in-band transceiver to search for and acquire information on the femtocell in compressed mode.

\* \* \* \* \*